US012060812B1

(12) United States Patent
Grooms et al.

(10) Patent No.: US 12,060,812 B1
(45) Date of Patent: Aug. 13, 2024

(54) TURBO ENGINE HAVING BLADE PITCH ACTUATION SYSTEM FOR VARIABLE PITCH FAN

(71) Applicant: General Electric Company, Schenectady, NY (US)

(72) Inventors: James H. Grooms, Hamilton, OH (US); Keith A. Miedema, Fairfield, OH (US); Randy M. Vondrell, Newport, KY (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 18/184,785

(22) Filed: Mar. 16, 2023

(51) Int. Cl.
*F01D 7/00* (2006.01)

(52) U.S. Cl.
CPC .......... *F01D 7/00* (2013.01); *F05D 2220/323* (2013.01); *F05D 2240/30* (2013.01); *F05D 2260/70* (2013.01)

(58) Field of Classification Search
CPC .. F01D 7/00; F05D 2220/323; F05D 2240/30; F05D 2260/70
See application file for complete search history.

(56) References Cited

U.S. PATENT DOCUMENTS 3,560,108 A * 2/1971 Lindahl .................. B63H 3/082 416/157 R
3,637,323 A * 1/1972 Chilman ................. B64C 11/30 416/157 R
5,174,718 A * 12/1992 Lampeter ................ B64C 11/38 416/157 R
5,186,608 A * 2/1993 Bagge ..................... B64C 11/38 416/37
8,696,303 B2 4/2014 Gallet
9,120,559 B2 9/2015 Danielson et al.
11,097,832 B2 8/2021 Maver
2011/0274547 A1* 11/2011 Morgan ................ B64C 11/325 416/157 R
2016/0265547 A1* 9/2016 Fulayter ................ F04D 29/323
2020/0198774 A1* 6/2020 Bennett ................... B64C 25/34
2020/0324877 A1 10/2020 Chahal et al.

FOREIGN PATENT DOCUMENTS

| | | |
|---|---|---|
| FR | 1313415 | 1/1962 |
| FR | 2957986 | 3/2010 |
| FR | 3032423 | 6/2015 |
| WO | 2022189746 | 9/2022 |

* cited by examiner

*Primary Examiner* — J. Todd Newton
*Assistant Examiner* — Aye S Htay
(74) *Attorney, Agent, or Firm* — HANLEY, FLIGHT & ZIMMERMAN, LLC

(57) ABSTRACT

An example turbo engine includes a rotary hub and a propeller including a blade coupled to the rotary hub. The blade is rotatable about a radial axis to change a pitch of the blade. The turbo engine also includes a blade pitch actuation system including an actuator coupled to the blade. The actuator is moveable in a first direction to rotate the blade to a feather position and in a second direction to rotate the blade away from the feather position. The blade pitch actuation system also includes a hydraulic system to provide hydraulic fluid to one or more hydraulic chambers to move the actuator and a pressurized pneumatic chamber formed by a portion of the actuator. The pressurized pneumatic chamber biases the actuator in the first direction to move the blade to the feather position in an event of failure of the hydraulic system.

18 Claims, 3 Drawing Sheets

TURBO ENGINE HAVING BLADE PITCH ACTUATION SYSTEM FOR VARIABLE PITCH FAN

FIELD OF THE DISCLOSURE

The present disclosure relates generally to a turbo engine having a variable pitch fan and, more particularly, to a blade pitch actuation system for a variable pitch fan.

BACKGROUND

Turbo engines (e.g., turbofan engines, turboprop engines, etc.), such as those used on aircraft, generally include a propeller/fan and a gas turbine engine to drive the propeller/fan to produce thrust. In some configurations, the propeller/fan has variable pitch blades. As such, the pitch of the blades can be changed during different phases of operation.

BRIEF DESCRIPTION OF THE DRAWINGS

A full and enabling disclosure of the presently described technology, including the best mode thereof, directed to one of ordinary skill in the art, is set forth in the specification, which makes reference to the appended Figs., in which:

FIG. 2 shows the example blades in a first pitch position.

Figure 1:
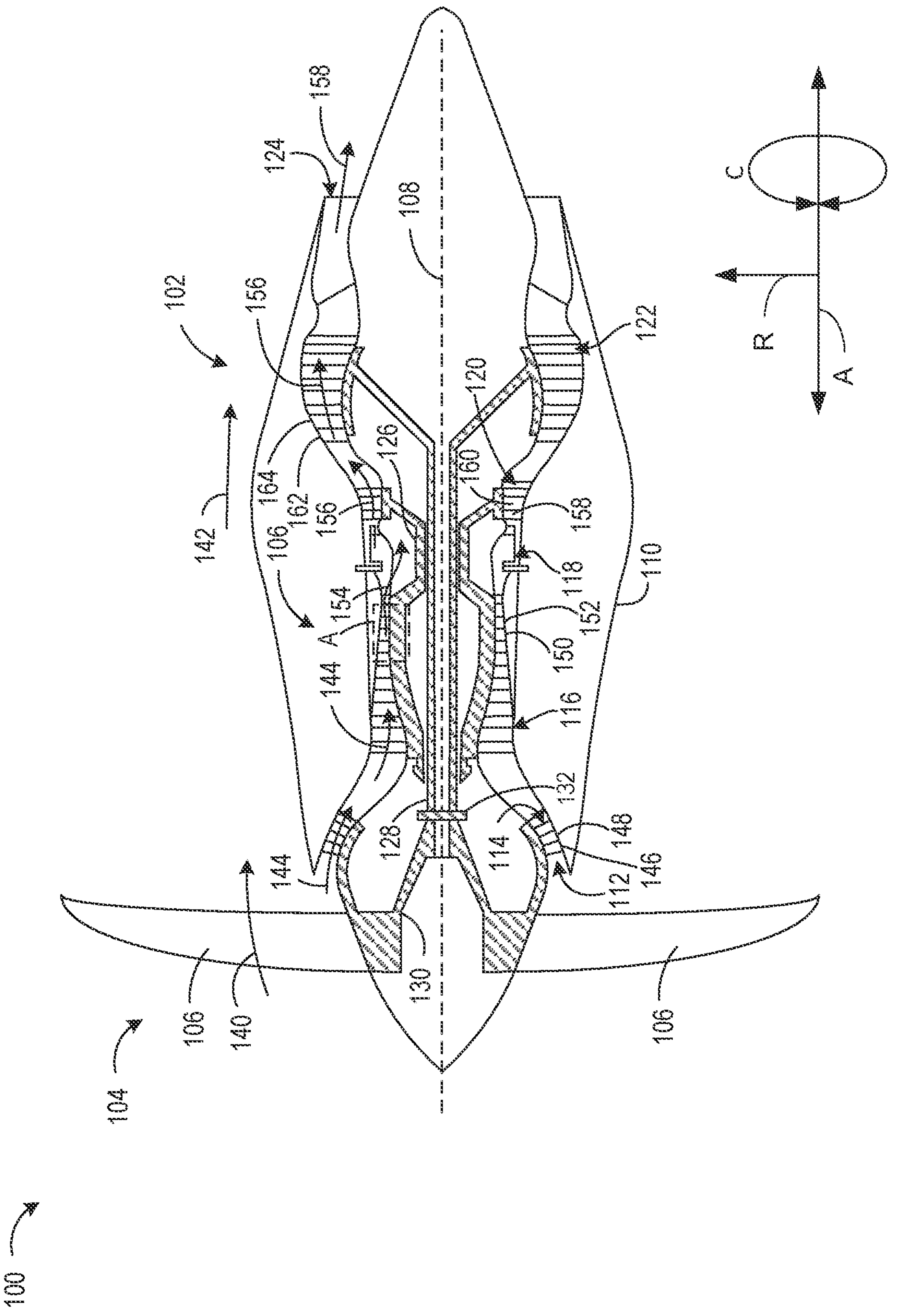
FIG. 1 is a schematic cross-sectional view of an example turboprop engine in which examples disclosed herein can be implemented.

The figures are not to scale. Instead, the thickness of regions may be enlarged in the drawings. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" and/or "direct contact" with another part means that there is no intermediate part between the two parts.

DETAILED DESCRIPTION

Reference now will be made in detail to embodiments or examples of the presently described technology, one or more examples of which are illustrated in the drawings. Each example is provided by way of explanation of the presently described technology, not limitation of the presently described technology. In fact, it will be apparent to those skilled in the art that various modifications and variations can be made in the presently described technology without departing from the scope or spirit of the presently described technology. For instance, features illustrated or described as part of one embodiment or example can be used with another embodiment or example to yield a still further embodiment or example. Thus, it is intended that the presently described technology covers such modifications and variations as come within the scope of the appended claims and their equivalents.

When introducing elements of various embodiments of the present disclosure, the articles "a," "an," "the," and "said" are intended to mean that there are one or more of the elements. As used herein, the terms "first", "second", and "third" may be used interchangeably to distinguish one component from another and are not intended to signify location or importance of the individual components. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object.

The terms "upstream" and "downstream" refer to the relative direction with respect to fluid flow in a fluid pathway. For example, "upstream" refers to the direction from which the fluid flows, and "downstream" refers to the direction to which the fluid flows. As used herein, the terms "axial" and "longitudinal" both refer to a direction parallel to the centerline axis of a gas turbine engine (e.g., a turboprop, a core gas turbine engine, etc.), while "radial" refers to a direction perpendicular to the axial direction, and "tangential" or "circumferential" refers to a direction mutually perpendicular to the axial and radial directions. Accordingly, as used herein, "radially inward" refers to the radial direction from the outer circumference of the gas turbine engine towards the centerline axis of the gas turbine engine, and "radially outward" refers to the radial direction from the centerline axis of the gas turbine engine towards the outer circumference of the gas turbine engine.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Additionally, although individual features may be included in different examples or claims, these may possibly be combined, and the inclusion in different examples or claims does not imply that a combination of features is not feasible and/or advantageous.

Some turbo engines used on aircraft, such turboprop engines, unducted fan (UDF) engines, and high bypass turbofan engines have variable pitch blades or vanes. In particular, the pitch (e.g., angle) of the blades relative to the incoming airflow can be changed during operation of the engine. This enables optimal operation of the turbo engine during the various flight phases. These types of engines include a blade pitch actuation system to control the pitch of the blades. The blade pitch actuation system is hydraulically powered. In the event of failure of the hydraulic system and/or engine shut down during flight, it is desirable for the blades to move to a certain pitch position, referred to as a feather position, in which the blades cause the least (e.g., minimal) amount of resistance or drag. In some instances, the feather position corresponds to a position or angle in which the blades are substantially aligned (e.g., ±5°) with the direction of the incoming airflow.

Some known blade pitch actuation systems include counterweights to move the blades to the feather position. However, these systems are heavy and are often difficult to implement on large open rotor designs. Other known systems utilize springs. However, these springs are also heavy and can be difficult to design to meet the allowable space, load, and travel requirements. Other known systems include oil back-up systems. In the event of failure of the main hydraulic oil system, a back-up oil system is activated to provide the force to move the blades to the feather position. However, these systems are relatively complex, heavy, and require additional activation for operation.

Disclosed herein are example blade pitch actuation systems having a pneumatic system as a failsafe to move the blades to the feather position in the event of failure of the blade pitch actuation system and/or shut down of the engine. The pneumatic system includes a pressurized pneumatic chamber that is filled with a pressurized gas, such as nitrogen. The pressurized pneumatic chamber is sealed and provides a constant biasing force in the direction of the feather position. As such, the pressurized pneumatic chamber is loaded at all times during normal operation of the blade pitch actuation system. However, in the event of failure of the hydraulic oil system and/or engine shut down, the pressurized pneumatic chamber acts in a passive manner to move the blades to the feather position.

Compared to the known systems described above, the example pneumatic chamber is relatively light. This reduces weight and, thus, improves efficiency of the engine. The pressurized pneumatic chamber provides a relatively high load capability due to the compressibility of the pneumatic gas (e.g., nitrogen). Further, the example pressurized pneumatic chamber is less complex than the known systems described above, which further reduces the number of parts, weight, and overall costs of the system. The example pressurized pneumatic chamber operates in a passive manner to automatically move the blades. As such, the example system does not require specific activation or operation of another system as seen in the oil back-up system mentioned above. Further, the example pressurized pneumatic chamber is capable of operation in high rotational environments and extreme temperatures ranges (e.g., low temperatures experienced at high altitudes), such as those experienced during flight.

Referring now to the drawings, wherein identical numerals indicate the same elements throughout the figures, FIG. 1 is a schematic cross-sectional view of an example turbo engine 100 that can incorporate various examples disclosed herein. In this example, the turbo engine 100 is a turboprop-type of engine, referred to herein as the turboprop engine 100. However, the principles of the present disclosure are also applicable to other types of engines, such as turbofan engines (e.g., high-bypass turbofan engines, low-bypass turbofan engines), unducted fan (UDF) engines (sometimes referred to as propfans), and/or other types of engines having a propulsor (e.g., a fan, a propeller, etc.) with variable pitch blades or vanes. Further, the examples disclosed herein can also be used in connection with other types of applications, such as electric fans or wind turbines having variable pitch fans.

As shown in FIG. 1, the turboprop engine 100 includes a gas turbine engine 102 (which may also be referred to as a core turbine engine or turbo-machinery) and a propeller 104 including a plurality of blades 106 (sometimes referred to as rotors or vanes). The propeller 104 can include any number of blades 106. The gas turbine engine 102 is disposed downstream from the propeller 104 and drives the blades 106 of the propeller 104 to produce forward thrust. As shown in FIG. 1, the turboprop engine 100 and/or the gas turbine engine 102 define a longitudinal or axial centerline axis 108 extending therethrough for reference. FIG. 1 also includes an annotated directional diagram with reference to an axial direction A, a radial direction R, and a circumferential direction C. In general, as used herein, the axial direction A is a direction that extends generally parallel to the centerline axis 108, the radial direction R is a direction that extends orthogonally outward from or inward toward the centerline axis 108, and the circumferential direction C is a direction that extends concentrically around the centerline axis 108. Further, as used herein, the term "forward" refers to a direction along the centerline axis 108 in the direction of movement of the turboprop engine 100, such as to the left in FIG. 1, while the term "rearward" refers to a direction along the centerline axis 108 in the opposite direction, such as to the right in FIG. 1.

The gas turbine engine 102 includes a substantially tubular outer casing 110 (which may also be referred to as a mid-casing) that defines an annular inlet 112. The outer casing 110 of the gas turbine engine 102 can be formed from a single casing or multiple casings. The outer casing 110 encloses, in serial flow relationship, a compressor section having a booster or low pressure compressor 114 ("LP compressor 114") and a high pressure compressor 116 ("HP compressor 116"), a combustion section 118 (which may also be referred to as the combustor 118), a turbine section having a high pressure turbine 120 ("HP turbine 120") and a low pressure turbine 122 ("LP turbine 122"), and an exhaust section 124. The gas turbine engine 102 includes a high pressure shaft or spool 126 ("HP shaft 126") that drivingly couples the HP turbine 120 and the HP compressor 116. The gas turbine engine 102 also includes a low pressure shaft or spool 128 ("LP shaft 128") that drivingly couples the LP turbine 122 and the LP compressor 114. The LP shaft 128 also couples to a propeller spool or shaft 130 (sometimes referred to as a fan shaft). The blades 106 are coupled to and extend radially outward from the propeller shaft 130. In this example, the blades 106 are variable pitch blades. As such, the pitch of the blades 106 can be changed during operation of the turboprop engine 100 to improve efficiency and achieve certain flow characteristics during different phases of flight. Example systems for changing the pitch of the blades 106 are disclosed in further detail herein. In some examples, the LP shaft 128 may couple directly to the propeller shaft 130 (i.e., a direct-drive configuration). In alternative configurations, the LP shaft 128 may couple to the propeller shaft 130 via a reduction gear 132 (i.e., an indirect-drive or geared-drive configuration). While in this example the gas turbine engine 102 includes two compressor and two turbines, in other examples, the gas turbine engine 102 may only include one compressor and one turbine.

As illustrated in FIG. 1, during operation of the turboprop engine 100, incoming air 140 enters the propeller 104 and is accelerated by the blades 106. A first portion 142 of the air 140 flows along the outside of the gas turbine engine 102, while a second portion 144 of the air 140 flows into the inlet 112 of the gas turbine engine 102 (and, thus, into the LP compressor 114). One or more sequential stages of LP compressor stator vanes 146 and LP compressor rotor blades 148 coupled to the LP shaft 128 progressively compress the second portion 144 of the air 140 flowing through the LP compressor 114 en route to the HP compressor 116. Next, one or more sequential stages of HP compressor stator vanes 150 and HP compressor rotor vanes 152 coupled to the HP shaft 126 further compress the second portion 144 of the air 140 flowing through the HP compressor 116. This provides compressed air 154 to the combustion section 118 where it mixes with fuel and burns to provide combustion gases 156.

The combustion gases 156 flow through the HP turbine 120 where one or more sequential stages of HP turbine stator vanes 158 and HP turbine rotor blades 160 coupled to the HP shaft 126 extract a first portion of kinetic and/or thermal energy. This energy extraction supports operation of the HP compressor 116. The combustion gases 156 then flow through the LP turbine 122 where one or more sequential stages of LP turbine stator vanes 162 and LP turbine rotor blades 164 coupled to the LP shaft 128 extract a second portion of thermal and/or kinetic energy therefrom. This energy extraction causes the LP shaft 128 to rotate, which supports operation of the LP compressor 114 and/or rotation of the propeller shaft 130. The combustion gases 156 then exit the gas turbine engine 102 through the exhaust section 124 thereof. The combustion gases 156 mix with the first portion 142 of the air 140 to produce propulsive thrust.

Along with the turboprop engine 100, the gas turbine engine 102 serves a similar purpose and sees a similar environment in land-based gas turbines, and turbofan and turbojet engines in which the ratio of the first portion 142 of the air 140 to the second portion 144 of the air 140 is different. In each of the engines, a speed reduction device (e.g., the reduction gear 132) may be included between any shafts and spools. For example, the reduction gear 132 may be disposed between the LP shaft 128 and the propeller shaft 130.

Figure 2:
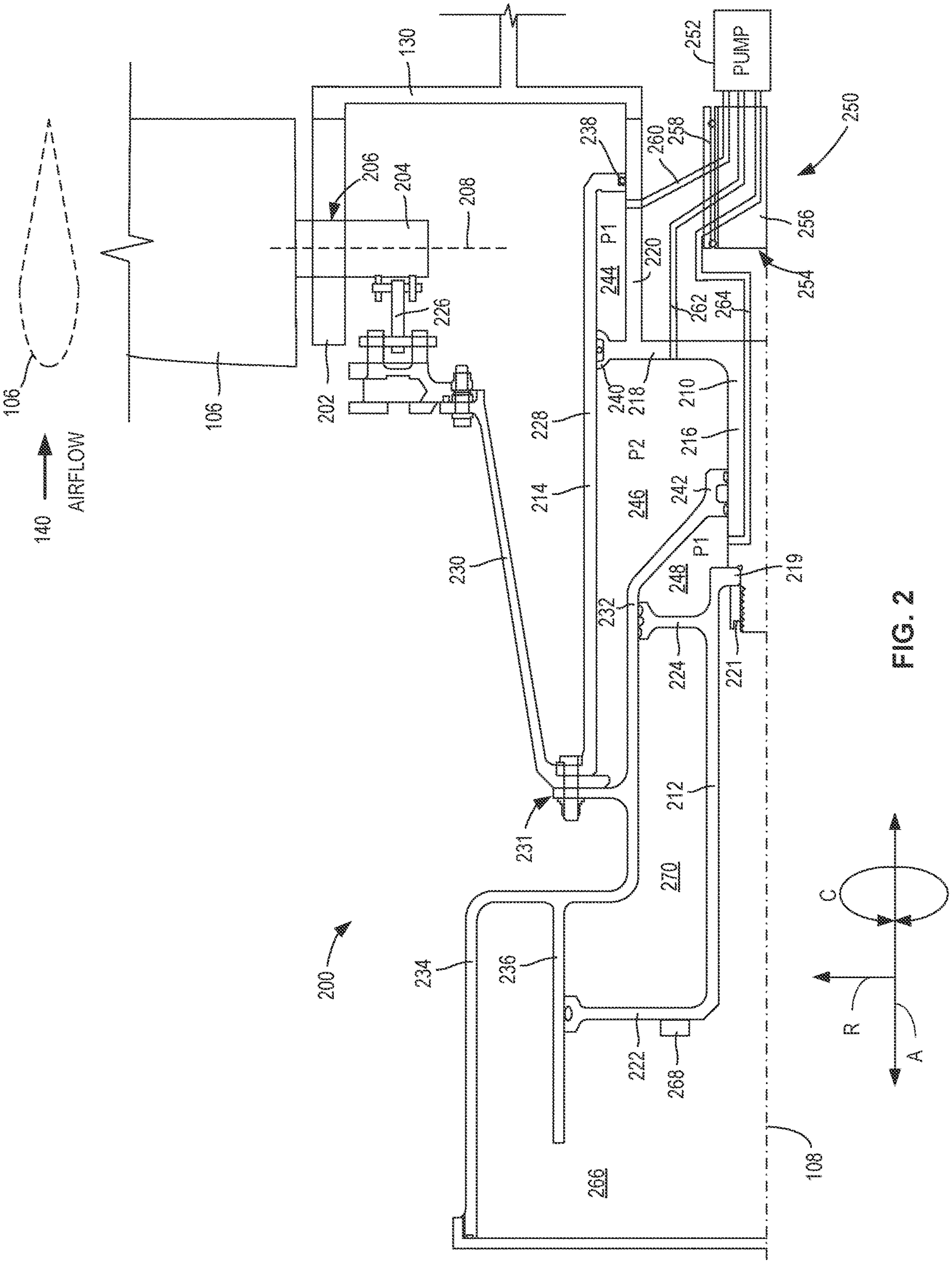
FIG. 2 is an enlarged cross-sectional view of an example blade pitch actuation system that can be implemented on the example turboprop engine of FIG. 1 to control the pitch of example blades of the example turboprop engine.

FIG. 2 is a cross-sectional view of an example blade pitch actuation system 200 that can be implemented on the example turboprop engine 100 of FIG. 1. Only the top half of the blade pitch actuation system 200 is shown in FIG. 2. However, it is understood that that the blade pitch actuation system 200 is symmetrical about the centerline axis 108 of the turboprop engine 100 (FIG. 1). The blade pitch actuation system 200 may also be referred to as a fan pitch actuation system (FPAS). The blade pitch actuation system 200 controls the pitch (e.g., angle, orientation) of the blades 106. The blades 106 are rotatable about radial axes to change the pitch of the blades 106. The blade pitch actuation system 200 can rotate the blades 106 about the radial axes to change the pitch of the blades 106 during flight, which can be used to improve efficiency and/or produce certain flow characteristics during operation of the turboprop engine 100. In some examples, the blade pitch actuation system 200 can move the blades 106 between two end positions. A first end position, referred to herein as a feather position, corresponds to a position in which the blades 106 produce the least (e.g., minimal) amount resistance or drag. In some examples, this position corresponds to a position in which the blades 106 are aligned or substantially aligned (e.g., ±5°) with the flow of the incoming air 140. This reduces (e.g., minimizes) resistance or drag caused by the blades 106, which is desirable when the turboprop engine 100 is not operating. In some examples, a second end position is a reverse position in which the blades 106 exceed, for example, a plane that is transverse to the centerline axis of the turbine engine (the direction of forward movement of the aircraft) by a certain degree (e.g., 30°) so as to assist with the braking of the aircraft. Therefore, in some examples, the angular stroke of the blades 106 between the feather position and the reverse position is, for example, approximately 120°. The blades 106 can be moved to any position or angle between the feather position and the reverse position depending on the phase of flight to improve (e.g., optimize) efficiency of the turboprop engine 100. In some examples, one or more stops or limits are provided to prevent the blades 106 from being rotated beyond these two end positions. In other examples, the blade pitch actuation system 200 can be configured to provide a larger or smaller stroke and/or the end positions may be different.

FIG. 2 shows the propeller shaft 130 of the turboprop engine 100 (FIG. 1). The propeller shaft 130 is coupled to and driven by the LP shaft 128 (FIG. 1). As shown in FIG. 2, the turboprop engine 100 includes a rotary hub 202. The rotary hub 202 is coupled to and driven by the propeller shaft 130. The rotary hub 202 can be coupled directly or indirectly (e.g., via one or more shafts or components) to the propeller shaft 130. Each of the blades 106 is coupled to and extends radially outward from the rotary hub 202. Therefore, as the propeller shaft 130 is rotated (via the LP shaft 128), the propeller shaft 130 rotates the rotary hub 202, which rotates the blades 106 to generate thrust. Only one example blade 106 is depicted in FIG. 2. However, it is understood the turboprop engine 100 can include any number of blades (e.g., 10 blades, 20 blades, etc.) distributed circumferentially around the rotary hub 202. Any of the details disclosed herein in connection with the blade 106 depicted in FIG. 2 can likewise apply to the other blades 106.

In the illustrated example, the blade 106 has a root 204 that extends through an opening 206 in the rotary hub 202. The root 204 is rotatable in the opening 206. This enables the blade 106 to rotate about a radial axis 208 extending from the centerline axis 108 of the turboprop engine 100. As such, the pitch of the blade 106 can be changed relative to the flow of incoming air 140. In particular, in this example, the blade 106 can be rotated (e.g., pitched) to any position between the first end position (the feather position) and the second end position (the reverse position). In FIG. 2, the blade 106 is shown in the feather position. FIG. 2 includes a cross-sectional view of the blade 106 (shown in dashed lines)

depicting the orientation of the blade 106 relative to the flow of the incoming air 140. In the feather position, the blade 106 is substantially aligned with the flow of the incoming air 140, which reduces resistance or drag. The blades 106 are typically held in the feather position when the turboprop engine 100 is not running.

In the illustrated example of FIG. 2, the blade pitch actuation system 200 includes a piston retainer 210, a piston 212, and an actuator 214. The piston retainer 210 is coupled (e.g., bolted) to the propeller shaft 130 such that the piston retainer 210 rotates with the propeller shaft 130. Therefore, the piston retainer 210 is coupled (indirectly) to and rotated by the LP shaft 128 (FIG. 1). Also, the piston 212 is coupled to and extends in a forward direction from the piston retainer 210. Therefore, the piston 212 also rotates with the piston retainer 210 and the propeller shaft 130. The actuator 214 also rotates with the piston retainer 210 and the piston 212, but is axially slidable relative to the piston retainer 210 and the piston 212, as disclosed in further detail herein. In some examples, the actuator 214 is disposed within a nose cone of the turboprop engine 100 (FIG. 1).

In the illustrated example of FIG. 2, the piston retainer 210 has a first portion 216 (e.g., a post), a second portion 218 (e.g., a flange) that extends radially outward from the first portion 216, and a third portion 220 (e.g., a shaft) that extends axially from the second portion 218. The third portion 220 is coupled (e.g., bolted) to the propeller shaft 130. The piston retainer 210 can be constructed as multiple parts coupled (e.g., welded) together or as a single unitary part or component (e.g., a monolithic structure).

In the illustrated example of FIG. 2, the piston 212 is coupled to and extends forward from the first portion 216 of the piston retainer 210. In this example, a rear end 219 of the piston 212 is disposed on the first portion 216 of the piston retainer 210. A retainer 221 is threaded onto the piston retainer 210, which secures the piston 212 on the piston retainer 210. In other examples, the piston 212 can be coupled to the piston retainer 210 via other mechanical and/or fastening techniques. In the illustrated example, the piston 212 is a dual piston having a first piston disc 222 and a second piston disc 224. As shown in FIG. 2, the first piston disc 222 has a larger diameter than the second piston disc 224. The piston 212 can be constructed as multiple parts coupled (e.g., welded) together or as a single unitary part or component (e.g., a monolithic structure).

In the illustrated example of FIG. 2, the actuator 214 is disposed radially outward of (e.g., around, surrounding) the piston retainer 210 and the piston 212. The actuator 214 is keyed to the piston retainer 210. As such, the piston retainer 210 rotates the actuator 214. However, the actuator 214 is slidable along the piston retainer 210 in the axial direction A (left and right in FIG. 2). This movement is used to change the pitch of the blades 106. The actuator 214 is coupled to the blade 106. In particular, in this example, the blade pitch actuation system 200 includes a link 226 coupled between the actuator 214 and the root 204 of the blade 106. The blade pitch actuation system 200 can be activated to move the actuator 214 axially (left or right in FIG. 2), which causes the link 226 to rotate the root 204, which rotates the blade 106 about the radial axis 208. The actuator 214 is similarly coupled to the other blades 106 via respective links. As such, movement of the actuator 214 causes all of the blades 106 to rotate (e.g., pitch) simultaneously. When the actuator 214 is moved in a first direction (the forward direction, or to the left in FIG. 2), the blades 106 are rotated to the feather position, and when the actuator 214 is moved in a second direction (the rearward direction, or to the right in FIG. 2), the blades 106 are rotated away from the feather position and toward the reverse position. However, in other examples, the blade pitch actuation system 200 can be configured so that the movement of the actuator 214 is reversed.

In the illustrated example, the actuator 214 has a first portion 228, a second portion 230, third portion 232, a fourth portion 234, and a fifth portion 236. The first portion 228 extends generally in the axial direction. The second portion 230 is disposed radially outward of the first portion 228 and is coupled to the first portion 228 at a joint 231 (e.g., a bolted joint). The third portion 232 is disposed radially inward of the first portion 228 and coupled to the first and second portion 228, 230 at the joint 231. The fourth portion 234 extends forward from the first, second, and third portions 228, 230, 232 and forms a pressurized pneumatic chamber 266, disclosed in further detail herein. The fifth portion 236 is coupled to and extends axially within the fourth portion 234. The first, second, third, fourth, and fifth portions 228, 230, 232, 234, 236 form the actuator 214. In some examples, the portions 228, 230, 232, 234, 236 are separate parts or components that are coupled (e.g., welded, bolted) together. In other examples, one or more of the portions 228, 230, 232, 234, 236 can be constructed as a single unitary part or component (e.g., a monolithic structure).

In the illustrated example, an end 238 of the first portion 228 of the actuator 214 is sealingly engaged with (e.g., engaged with a seal to prevent fluid leakage) the third portion 220 of the piston retainer 210. An end 240 of the second portion 218 of the piston retainer 210 is sealingly engaged with the first portion 228 of the actuator 214. An end 242 of the third portion 232 of the actuator 214 is sealingly engaged with the first portion 216 of the piston retainer 210. The second piston disc 224 is sealingly engaged with the third portion 232 of the actuator 214. The first piston disc 222 is sealingly engaged with the fifth portion 236 of the actuator 214.

The blade pitch actuation system 200 includes one or more hydraulic chambers defined between the piston retainer 210, the piston 212, and the actuator 214. These hydraulic chamber(s) are used to control the position of the actuator 214 and, thus, control the pitch of the blades 106. For example, as shown in FIG. 2, the blade pitch actuation system 200 includes a first hydraulic chamber 244, a second hydraulic chamber 246, and a third hydraulic chamber 248. The first hydraulic chamber 244 is formed or defined between the first portion 228 of the actuator 214, the second portion 218 of the piston retainer 210, and the third portion 220 of the piston retainer 210. The second hydraulic chamber 246 is formed or defined between the first portion 228 of the actuator 214, the third portion 232 of the actuator 214, the first portion 216 of the piston retainer 210, and the second portion 218 of the piston retainer 210. The third hydraulic chamber 248 is formed or defined between third portion 232 of the actuator 214, the second piston disc 224, and the first portion 216 of the piston retainer 210. In this example, the first and third hydraulic chambers 244, 248 are provided with hydraulic fluid at a first pressure, referred to herein as P1, and the second hydraulic chamber 246 is provided with hydraulic fluid at a second pressure, referred to herein as P2. The pressures P1 and P2 can be any amount depending on the specific design. In some examples, the pressures P1 and P2 can be as high as 1000 psi or even higher. The pressures P1 and P2 can be increased or decreased to cause the actuator 214 to move axially forward or rearward, thus changing the pitch of the blades 106. For example, if the force acting on the actuator 214 from the first pressure P1 in the first and third hydraulic chambers 244, 248 is greater than the force acting on the actuator 214 from the second pressure P2 in the second hydraulic chamber 246, the actuator 214 moves (e.g., slides) rearward (to the right in FIG. 2) along the piston retainer 210 and the piston 212. Conversely, if the force acting on the actuator 214 from the first pressure P1 in the first and third hydraulic chambers 244, 248 is less than the force acting on the actuator 214 from the second pressure P2 in the second hydraulic chamber 246, the actuator 214 moves (e.g., slides) forward (to the left in FIG. 2) along the piston retainer 210 and the piston 212. Therefore, the first and third hydraulic chambers 244, 248 are to receive hydraulic fluid to move the actuator 214 in the rearward direction while the second hydraulic chamber 246 is to receive hydraulic fluid to move the actuator 214 in the forward direction.

The blade pitch actuation system 200 includes a hydraulic system 250 to provide hydraulic fluid, such as oil, to one or more of the hydraulic chambers 244-248 to control the movement of the actuator 214. The hydraulic system 250 includes a pump 252 to control the pressures P1 and P2. The pump 252 can be activated to move hydraulic fluid into or out of the chambers 244-248 to increase or decrease the pressures P1 and P2 and therefore cause the actuator 214 to move forward or rearward. In the illustrated example, the hydraulic system 250 includes an oil transfer bearing 254. The oil transfer bearing 254 includes a fixed portion 256 (e.g., a shaft) with fluid passageways fluidly coupled to the pump 252. The fixed portion 256 does not rotate or move axially. The oil transfer bearing 254 includes a sleeve 258 that is rotatable about the fixed portion 256. The hydraulic system 250 includes first, second, and third fluid lines 260, 262, 264 fluidly coupled between the oil transfer bearing 254 and the respective first, second, and third hydraulic chambers 244, 246, 248. The first fluid line 260 extends through the third portion 220 of the piston retainer 210 to the first hydraulic chamber 244, the second fluid line 262 extends through the second portion 218 of the piston retainer 210 to the second hydraulic chamber 246, and the third fluid line 264 extends through the first portion 216 of the piston retainer 210 to the third hydraulic chamber 248. The fluid lines 260, 262, 264 are coupled to the sleeve 258. The sleeve 258 enables fluid communication between the fluid lines 260, 262, 264, which are rotating with the blade pitch actuation system 200, and the fixed portion 256 of the oil transfer bearing 254. Thus, the oil transfer bearing 254 enables hydraulic fluid to be transferred between a stationary component and a rotating component. As disclosed above, the first and third chambers 244, 248 are provided with hydraulic fluid at the same pressure P1. The oil transfer bearing 254 and/or the pump 252 fluidly couple the fluid in the first and third fluid lines 260, 264 such that the first and third hydraulic chambers 244, 248 remain are at the same pressure P1.

Figure 3:
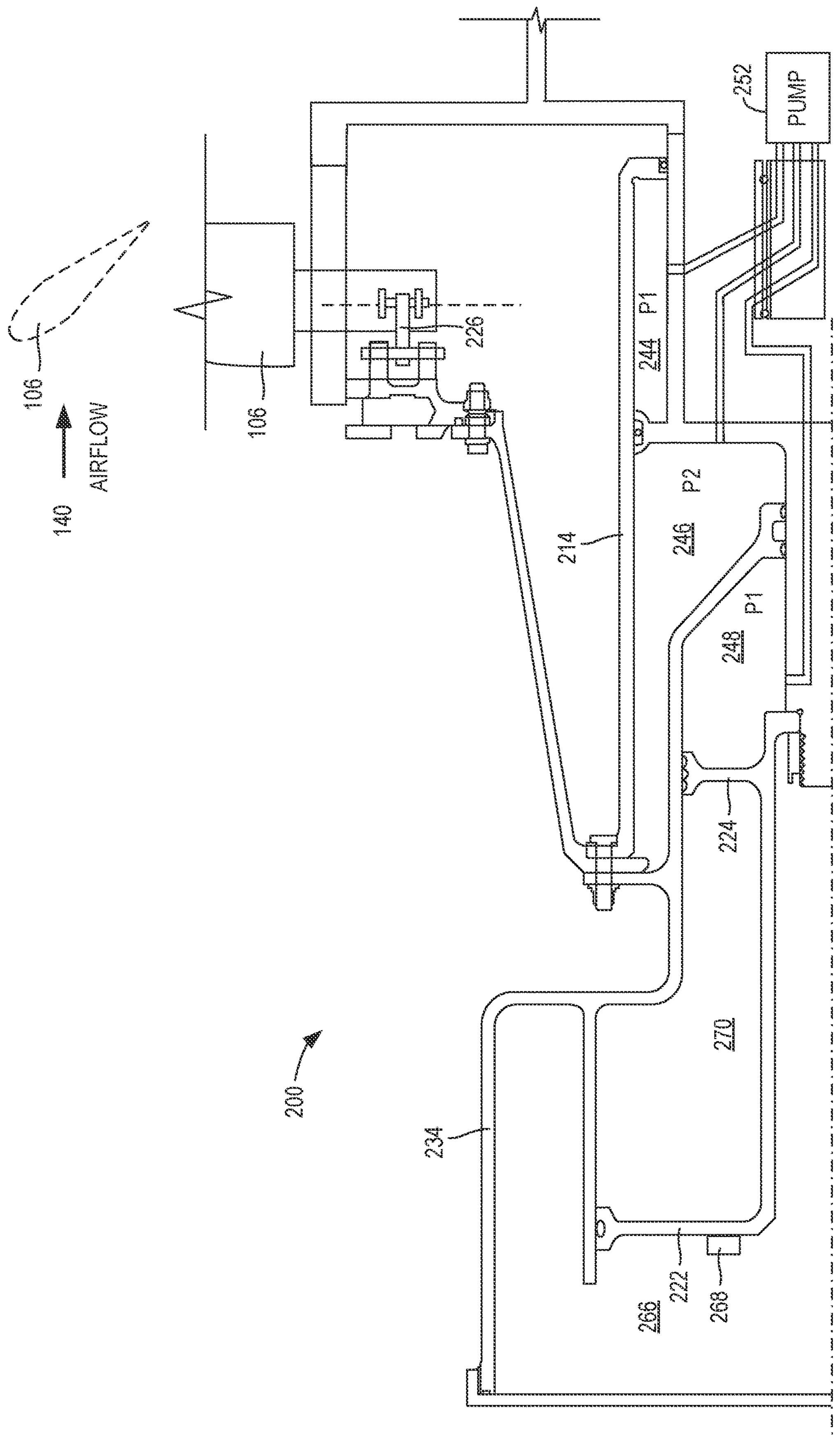
FIG. 3 shows the example blade pitch actuation system of FIG. 2 with the example blades moved to a second pitch position.

To move the blades 106 away from the feather position and toward the reverse position, the pump 252 can be activated to increase the first pressure P1 in the first and third hydraulic chambers 244, 248 and reduce the pressure P2 in the second hydraulic chamber 246. As a result, the actuator 214 moves in the rearward direction (to the right in FIG. 2) to the position shown in FIG. 3. The actuator 214 pushes the links 226 rearward (to the right in FIG. 3), which causes the blades 106 to rotate away from the feather position and toward the reverse position. FIG. 3 includes a cross-sectional view of the blade 106 (shown in dashed lines) depicting the orientation of the blade 106 relative to the flow of the incoming air 140. In FIG. 3, the blade 106 is in a position between the feather position and the reverse position. When the desired position is reached, the pump 252 can be deactivated and/or otherwise balance the loads on the actuator 214 to maintain the current position. The pump 252 can further increase the pressure P1 and/or decrease the pressure P2 to further move the blades 106 toward the reverse position. Otherwise, to move the blades 106 back to the feather position, the pump 252 can be activated to reduce the first pressure P1 in the first and third hydraulic chambers 244, 248 and/or increase the second pressure P2 in the second hydraulic chamber 246. Thus, the hydraulic system 250 is used to control the position of the actuator 214 for controlling the pitch of the blades 106. In this example the first and third hydraulic chambers 244, 248 are pressurized with the same pressure P1. In some examples, this reduces the overall pressure P1 required to control the actuator 214. However, in other examples the first and third hydraulic chambers 244, 248 can be pressurized at different pressures.

In the example of FIGS. 2 and 3, the blade pitch actuation system 200 includes a pressurized pneumatic chamber 266. The pressurized pneumatic chamber 266 is formed or defined by the fourth portion 234 of the actuator 214 and the piston 212 (and, in particular, the first piston disc 222). The pressurized pneumatic chamber 266 is filled with a pressurized gas. In some examples, the pressurized pneumatic chamber 266 contains pressurized nitrogen. In other examples, the pressurized pneumatic chamber 266 can be filled with another pressurized gas (e.g., air). The pressurized pneumatic chamber 266 is sealed. A such, the volume of the pressurized gas (e.g., nitrogen) in the pressurized pneumatic chamber 266 does not change. During manufacture and/or assembly of the blade pitch actuation system 200, the pressurized pneumatic chamber 266 can be charged with gas (e.g., nitrogen) and then sealed. The pressurized pneumatic chamber 266 can be pressurized to any amount depending on the size of the chambers 244, 246, 248, 266 and the desired biasing force. In some examples, the pressure in the pressurized pneumatic chamber 266 can be about 720 psi-920 psi. However, in other examples, the pressure may be less than or greater than these example values.

The pressurized gas in the pressurized pneumatic chamber 266 generates a constant force or load that biases the actuator 214 in the forward direction (to the left in FIGS. 2 and 3), which corresponds to the feather position of the blades 106. This provides a failsafe to move the blades 106 to the feather position in an event of failure of the hydraulic system 250 and/or shutdown of the turboprop engine 100. For example, if the hydraulic system 250 and/or the gas turbine engine 102 fails or is shut down, the hydraulic system 250 is not able to provide pressurized hydraulic fluid to the hydraulic chambers 244, 246, 248 to control or maintain the position of the actuator 214. In such an instance, the force on the actuator 214 from the pressurized gas in the pressurized pneumatic chamber 266 overcomes the force on the actuator 214 from the first and third hydraulic chambers 244, 248. As such, the actuator 214 moves in the forward direction (to the left in FIGS. 2 and 3), which move the blades 106 to the feather position shown in FIG. 2. As such, the pressurized pneumatic chamber 266 provides a passive system that moves the blades 106 to the feather position in the event of failure or deactivation of the hydraulic system 250, which may occur if the gas turbine engine 102 fails or is shut down. Therefore, if one of the engines of an aircraft fails or is deactivated during flight, the blade pitch actuation system 200 automatically moves the blades 106 to the feather position (FIG. 2). This is advantageous because in the feather position, the blades 106 produce less resistance, which reduces drag on the turboprop engine 100 and the aircraft. This also reduces or prevents the blades 106 from spinning (due to incoming airflow) the internal turbo-machinery parts of the gas turbine engine 102.

As shown in FIGS. 2 and 3, the pressurized pneumatic chamber 266 has a larger diameter than the piston 212. In particular, the fourth portion 234 of the actuator 214 that partially forms the pressurized pneumatic chamber 266 has a larger diameter than the piston 212. This is because the first piston disc 222 is sealed against the fifth portion 236 of the actuator 214, which forms a small diameter area between the fourth and fifth portions 234, 236 of the actuator 214. This increases the area upon which the pressurized gas acts on the actuator 214 and, thus, increases the force created by the pressurized gas. Further, in this example, the pressurized pneumatic chamber 266 has a larger diameter than the first, second, and third hydraulic chambers 244-248. This is advantageous because a lower pressure gas can be used in the pressurized pneumatic chamber 266 while still producing a relatively high biasing force. Using a lower pressurized gas relaxes the sealing requirements to maintain the pressurized gas in the pressurized pneumatic chamber 266.

In some examples, the pressure in the pressurized pneumatic chamber 266 can be monitored to ensure a sufficient amount of pressure remains to move the actuator 214 in the event of shut down of the hydraulic system 250 (e.g., an amount of pressure dependent on the size of the pneumatic pressurized chamber 266 and loads required to move the blades 106). For example, as shown in FIGS. 2 and 3, a pressure sensor 268 is coupled to the piston 212 and disposed in the pressurized pneumatic chamber 266. The pressure sensor 268 measures the pressure in the pressurized pneumatic chamber 266. The pressure sensor 268 may communicate the pressure measurements to an engine control system (not shown). In some examples, if the pressure drops below a threshold pressure, the engine control system may trigger an alert to indicate the pressurized pneumatic chamber 266 may need to be checked.

The example pressurized pneumatic chamber 266 is advantageous because it has a high load capability due to the compressibility of the pneumatic gas (e.g., nitrogen). Further, the pressurized pneumatic chamber 266 enables a longer travel of the actuator 214 with relatively little change in load. Therefore, the pressurized pneumatic chamber 266 provides relatively constant load throughout the stroke. Also, the volume and areas of the pressurized pneumatic chamber 266 and the piston 212 can be varied to optimize the load versus travel of the actuator 214.

Therefore, during normal operation of the blade pitch actuation system 200, the first and third hydraulic chambers 244, 248 act to bias the actuator 214 in the rearward direction, while the second hydraulic chamber 246 and the pressurized pneumatic chamber 266 act to bias the actuator 214 in the forward direction. The pressures in the chambers 244, 246, 248, 266 can be controlled to substantially balance the forces and maintain the actuator 214 in a desired position. In the illustrated example of FIGS. 2 and 3, a chamber 270 is formed or defined between the actuator 214 and the first and second piston discs 222, 224. The chamber 270 is vented to the atmosphere. As such, the chamber 270 does not provide a force in either direction. In this example, the pressurized pneumatic chamber 266 is forward of the piston retainer 210 and the piston 212. In some examples, this is beneficial because there is additional space forward of these components. However, in other examples, the pressurized pneumatic chamber 266 can be disposed rearward of the piston 212 and the piston retainer 210.

In the example of FIGS. 2 and 3, the example blade pitch actuation system 200 does not include a pitch lock device. In particular, in known blade pitch actuation systems, a separate pitch lock device is required to hold the blades 106 once they are in the feather position. However, with the blade pitch actuation system 200, the pressurized pneumatic chamber 266 provides a constant biasing force to hold the blades 106 in the feather position, which eliminates the need for a separate pitch lock device. This reduces parts, complexity, weight, and costs of the blade pitch actuation system 200.

Therefore, it can be appreciated that examples have been disclosed herein that improve the ability for a blade pitch actuation system to move the blades to the feather position in the event of failure of the blade pitch actuation system and/or shut down of the engine. The example systems disclosed herein are passive and, thus, do not require complicated activation components or control systems. The example pressurized pneumatic chamber is capable of handling high rotational speeds and a large variation in operating temperatures, such as encountered during use on aircraft. The examples disclosed herein also eliminate the need for a pitch lock device. As such, the example systems can result in fewer parts, less complexity, reduced weight, and lower costs compared to known systems. While some of the example blade pitch actuation systems disclosed herein are described in connection with turboprop engines, it is understood that any of the example blade pitch actuation systems disclosed herein can be implemented in connection with other types of engines, such as a turbofan engine. The example blade pitch actuation system can be implemented in connection with engines that are gas-powered, electric-powered, and/or powered via another source. Further, the example blade pitch actuation systems disclosed herein can be used in connection with other (non-aircraft engine) devices having a variable pitch fan, such as an electric fan or a wind turbine.

Further examples and example combinations thereof are provided by the subject matter of the following clauses:

A turbo engine comprising a rotary hub; a propeller including a blade coupled to the rotary hub, the blade rotatable about a radial axis to change a pitch of the blade; and a blade pitch actuation system. The blade pitch actuation system includes an actuator coupled to the blade. The actuator is moveable in a first direction to rotate the blade to a feather position and in a second direction to rotate the blade away from the feather position. The blade pitch actuation system also includes a hydraulic system to provide hydraulic fluid to one or more hydraulic chambers to move the actuator and a pressurized pneumatic chamber formed by a portion of the actuator. The pressurized pneumatic chamber biases the actuator in the first direction to move the blade to the feather position in an event of failure of the hydraulic system.

The turbo engine of any preceding clause, wherein the pressurized pneumatic chamber contains pressurized nitrogen.

The turbo engine of any preceding clause, wherein the pressurized pneumatic chamber is sealed.

The turbo engine of any preceding clause, wherein the blade pitch actuation system includes: a piston retainer; and a piston coupled to the piston retainer, wherein the actuator is slidable along the piston retainer.

The turbo engine of any preceding clause, wherein the pressurized pneumatic chamber is formed by the portion of the actuator and the piston.

The turbo engine of any preceding clause, wherein the pressurized pneumatic chamber has a larger diameter than the piston.

The turbo engine of any preceding clause, wherein the blade pitch actuation system includes a first hydraulic chamber, a second hydraulic chamber, and a third hydraulic chamber, and wherein the first and third hydraulic chambers receive hydraulic fluid to move the actuator in the second direction and the second hydraulic chamber receives hydraulic fluid to move the actuator in the first direction.

The turbo engine of any preceding clause, wherein the pressurized pneumatic chamber has a larger diameter than the first, second, and third hydraulic chambers.

The turbo engine of any preceding clause, wherein the piston includes a first piston disc and a second piston disc, wherein the pressurized pneumatic chamber is defined by the portion of the actuator and the first piston disc, and wherein the third hydraulic chamber is defined by a portion of the piston retainer, a portion of the actuator, and the second piston disc.

The turbo engine of any preceding clause, wherein the first piston disc has a larger diameter than the second piston disc.

The turbo engine of any preceding clause, wherein the blade pitch actuation system includes a pressure sensor to measure pressure in the pressurized pneumatic chamber.

The turbo engine of any preceding clause, wherein the pressure sensor is coupled to the piston.

The turbo engine of any preceding clause, wherein the actuator is disposed radially outward of the piston retainer and the piston.

The turbo engine of any preceding clause, wherein the first direction is a forward direction and the second direction is a rearward direction.

The turbo engine of any preceding clause, wherein the blade pitch actuation system does not include a pitch lock device.

A turbo engine comprising: a propeller including a plurality of variable pitch blades; a gas turbine engine to drive the propeller to produce thrust; and a blade pitch actuation system to move the plurality of variable pitch blades between a feather position and a reverse position. The blade pitch actuation system includes a piston retainer; a piston coupled to the piston retainer; an actuator slidable along the piston retainer, the actuator coupled to the plurality of variable pitch blades; and a pressurized pneumatic chamber formed between a portion of the actuator and the piston. The pressurized pneumatic chamber is to bias the actuator in a first direction to move the plurality of variable pitch blades to the feather position in an event of shut down of the gas turbine engine.

The turbo engine of any preceding clause, wherein the actuator is disposed radially outward of the piston retainer and the piston.

The turbo engine of any preceding clause, wherein the portion of the actuator forming the pressurized pneumatic chamber has a larger diameter than the piston.

The turbo engine of any preceding clause, wherein the pressurized pneumatic chamber is disposed forward of the piston retainer and the piston.

The turbo engine of any preceding clause, wherein the pressurized pneumatic chamber biases the actuator in a forward direction.

A blade pitch actuation system for a turbo engine, the blade pitch actuation system comprising: a piston retainer coupled to and rotated by a shaft of a gas turbine engine of the turbo engine; a piston coupled to the piston retainer; an actuator disposed radially outward of the piston retainer and the piston, the actuator axially slidable along the piston retainer, the actuator coupled to a plurality of variable pitch blades of the turbo engine; a hydraulic system to provide hydraulic fluid to one or more hydraulic chambers to move the actuator; and a pressurized pneumatic chamber formed between a portion of the actuator and the piston, the pressurized pneumatic chamber biasing the actuator in a first direction to move the plurality of variable pitch blades to a feather position.

The blade pitch actuation system of any preceding clause, wherein the pressurized pneumatic chamber contains pressurized nitrogen.

The blade pitch actuation system of any preceding clause, wherein the pressurized pneumatic chamber has a larger diameter than the piston.

The blade pitch actuation system of any preceding clause, further including a pressure sensor to measure pressure in the pressurized pneumatic chamber.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A turbo engine comprising:

a rotary hub;

a propeller including a blade coupled to the rotary hub, the blade rotatable about a radial axis to change a pitch of the blade; and a blade pitch actuation system including:

an actuator coupled to the blade, the actuator moveable in a first direction to rotate the blade to a feather position and in a second direction to rotate the blade away from the feather position;

a hydraulic system to provide hydraulic fluid to one or more hydraulic chambers to move the actuator; and a pressurized pneumatic chamber formed by a portion of the actuator, the pressurized pneumatic chamber biasing the actuator in the first direction to move the blade to the feather position in an event of failure of the hydraulic system, wherein the blade pitch actuation system does not include a pitch lock device.

2. The turbo engine of claim 1, wherein the pressurized pneumatic chamber contains pressurized nitrogen.

3. The turbo engine of claim 1, wherein the pressurized pneumatic chamber is sealed.

4. The turbo engine of claim 1, wherein the blade pitch actuation system includes:

a piston retainer; and a piston coupled to the piston retainer, wherein the actuator is slidable along the piston retainer.

5. The turbo engine of claim 4, wherein the pressurized pneumatic chamber is formed by the portion of the actuator and the piston.

6. The turbo engine of claim 4, wherein the pressurized pneumatic chamber has a larger diameter than the piston.

7. The turbo engine of claim 4, wherein the blade pitch actuation system includes a first hydraulic chamber, a second hydraulic chamber, and a third hydraulic chamber, and wherein the first and third hydraulic chambers receive hydraulic fluid to move the actuator in the second direction and the second hydraulic chamber receives hydraulic fluid to move the actuator in the first direction.

8. The turbo engine of claim 7, wherein the pressurized pneumatic chamber has a larger diameter than the first, second, and third hydraulic chambers.

9. The turbo engine of claim 1, wherein the first direction is a forward direction and the second direction is a rearward direction.

10. A turbo engine comprising:
a rotary hub;
a propeller including a blade coupled to the rotary hub, the blade rotatable about a radial axis to change a pitch of the blade; and
a blade pitch actuation system including:
a piston retainer; and
a piston coupled to the piston retainer, wherein the piston includes a first piston disc and a second piston disc;
an actuator coupled to the blade, wherein the actuator is slidable along the piston retainer, the actuator moveable in a first direction to rotate the blade to a feather position and in a second direction to rotate the blade away from the feather position;
a first hydraulic chamber, a second hydraulic chamber, and a third hydraulic chamber;
a hydraulic system to provide hydraulic fluid to the first, second, and third hydraulic chambers to move the actuator, wherein the first and third hydraulic chambers receive hydraulic fluid to move the actuator in the second direction and the second hydraulic chamber receives hydraulic fluid to move the actuator in the first direction; and
a pressurized pneumatic chamber formed by a portion of the actuator, the pressurized pneumatic chamber biasing the actuator in the first direction to move the blade to the feather position in an event of failure of the hydraulic system, wherein the pressurized pneumatic chamber is defined by the portion of the actuator and the first piston disc, and wherein the third hydraulic chamber is defined by a portion of the piston retainer, a portion of the actuator, and the second piston disc.

11. A turbo engine comprising:
a propeller including a plurality of variable pitch blades;
a gas turbine engine to drive the propeller to produce thrust; and
a blade pitch actuation system to move the plurality of variable pitch blades between a feather position and a reverse position, the blade pitch actuation system including:
a piston retainer;
a piston coupled to the piston retainer;
an actuator slidable along the piston retainer, the actuator coupled to the plurality of variable pitch blades; and
a pressurized pneumatic chamber formed between a portion of the actuator and the piston, the pressurized pneumatic chamber disposed forward of the piston retainer and the piston, the pressurized pneumatic chamber to bias the actuator in a first direction to move the plurality of variable pitch blades to the feather position in an event of shut down of the gas turbine engine.

12. The turbo engine of claim 11, wherein the actuator is disposed radially outward of the piston retainer and the piston.

13. The turbo engine of claim 11, wherein the portion of the actuator forming the pressurized pneumatic chamber has a larger diameter than the piston.

14. The turbo engine of claim 11, wherein the pressurized pneumatic chamber biases the actuator in a forward direction.

15. A blade pitch actuation system for a turbo engine, the blade pitch actuation system comprising:
a piston retainer coupled to and rotated by a shaft of a gas turbine engine of the turbo engine;
a piston coupled to the piston retainer;
an actuator disposed radially outward of the piston retainer and the piston, the actuator axially slidable along the piston retainer, the actuator coupled to a plurality of variable pitch blades of the turbo engine;
a hydraulic system to provide hydraulic fluid to one or more hydraulic chambers to move the actuator; and
a pressurized pneumatic chamber formed between a portion of the actuator and the piston, the pressurized pneumatic chamber being a sealed chamber with a fixed volume of pressurized gas that provides a constant biasing force on the actuator in a first direction to move the plurality of variable pitch blades to a feather position.

16. The blade pitch actuation system of claim 15, wherein the pressurized pneumatic chamber contains pressurized nitrogen.

17. The blade pitch actuation system of claim 15, wherein the pressurized pneumatic chamber has a larger diameter than the piston.

18. The blade pitch actuation system of claim 15, further including a pressure sensor to measure pressure in the pressurized pneumatic chamber.

* * * * *